United States Patent
De Rycke et al.

(10) Patent No.: US 7,514,640 B2
(45) Date of Patent: Apr. 7, 2009

(54) LOAD BEAM FOR A WEIGHING APPARATUS

(75) Inventors: Stefan De Rycke, Zulte (BE); Didier O. M. Verhaeghe, Houthulst (BE); Johan O. Vanpoucke, Veldegem (BE); Niklaas G. C. Monteyne, Blankenberge (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/974,753

(22) Filed: Oct. 16, 2007

(65) Prior Publication Data

US 2008/0142278 A1    Jun. 19, 2008

(30) Foreign Application Priority Data

Dec. 19, 2006  (GB) ................... 0625242.3

(51) Int. Cl.
*G01G 23/02*   (2006.01)
(52) U.S. Cl. .................. 177/153; 177/255; 177/DIG. 9
(58) Field of Classification Search .......... 177/153, 177/255, DIG. 9
See application file for complete search history.

(56) References Cited

U.S. PATENT DOCUMENTS

| 4,765,423 | A | * | 8/1988 | Karpa | 177/211 |
| 5,600,104 | A | * | 2/1997 | McCauley et al. | 177/136 |
| 6,667,539 | B2 | * | 12/2003 | Adler | 257/595 |
| 7,038,146 | B2 | * | 5/2006 | Saito et al. | 177/136 |
| 2005/0284668 | A1 | * | 12/2005 | Hida et al. | 177/136 |

* cited by examiner

*Primary Examiner*—Randy W Gibson
(74) *Attorney, Agent, or Firm*—Patrick M. Sheldrake; John William Stader; Michael G. Harms

(57) ABSTRACT

A weighing apparatus comprises a weighing table secured to a support frame by way of a load beam, the load beam being an elongate member having a through hole receiving a securing bolt fixed to the weighing table. In the invention, the securing bolt passes through a bracket, having two limbs disposed above and below the load beam, respectively. A pressure distribution plate is compressed by the securing bolt between one limb, of the bracket and one side of the load beam. On the other side of the load beam, a cylindrical sleeve encircling the securing bolt passes through a hole in the other limb of the bracket, to prevent movement of the bracket transverse to the axis of the securing bolt.

9 Claims, 3 Drawing Sheets the present invention relates to a weighing apparatus and is particularly applicable to the weighing of bales as they are discharged from the bale chute of an agricultural baler.

LOAD BEAM FOR A WEIGHING APPARATUS

FIELD OF THE INVENTION

The present invention relates to a weighing apparatus and is particularly applicable to the weighing of bales as they are discharged from the bale chute of an agricultural baler.

BACKGROUND OF THE INVENTION

Weighing apparatus has previously been proposed comprising a weighing table secured to a support frame by way of load beams which produce electrical output signals indicative of the weight resting on the weighing table. An example of such a weighing apparatus is disclosed in copending patent application No. GB 0625240.7, where the weighing apparatus is built into the bale chute of an agricultural baler to weigh bales before they are discharged.

A perspective view of a known load beam is shown in FIG. 1. The load beam is constructed as a rod 12 of rectangular or square cross-section with holes 14 near its ends for receiving securing bolts.

FIG. 2 shows the load beam 10 of FIG. 1 when used in mounting a weighing table 16 on a support frame 18. On one side, the load beam 10 is connected by a securing bolt 20 to the weighing table 16 and on the other end it is connected by two bolts 22 to the support frame 18. A connection block 23 is placed between the load beam 10 and the support frame 18. This block 23 is used to level the load beam 10 to the horizontal in the weighing position, since the support frame is connected to a sloping chassis of the baler.

As an alternative, the block 23 can be omitted and the load beam 10 connected directly to the support frame 18. In this case, extra compensation is needed by software.

When a weight is supported on the table 16, the shearing force on the load beam 10 is measured by a sensor 24 which produces an electrical output signal indicative of the force acting down on the weighing table 16.

Conventionally, three or more load beams are used to mount a weighing table on a support frame but in the bale chute application mentioned above, it is proposed to use only two such load beams, one on each side of the bale chute. Because of the heavy weight of the bales and the fact that their centre of gravity does not at all times act directly down on the axis of the bolt 20, there is a moment tending to bend the bolt 20 in the manner shown in FIG. 3.

It would be highly desirable to enable the connection between the weighing table and the load beam of a weighing apparatus to withstand a large bending moment without damage to the securing bolt passing through the load beam.

SUMMARY OF THE INVENTION

According to the present invention, there is provided a weighing apparatus comprising a weighing table secured to a support frame by way of a load beam, wherein the load beam is an elongate member having a through hole receiving a securing bolt fixed to the weighing table, characterised in that the securing bolt passes through a stiffening member having parts disposed above and below the load beam, respectively, a pressure distribution plate is compressed by the securing bolt between a first part of the stiffening member and one side of the load beam, and, on the other side of the load beam, a cylindrical sleeve encircling the securing bolt passes through a hole in the second part of the stiffening member to prevent movement of the stiffening member transverse to the axis of the securing bolt.

The pressure distribution plate is preferably precisely symmetrical about the axis of the bolt and is either circular or more preferably square. Alternatively, a different shape of pressure distribution plate can be used, as long as the contact surface of the plate is such that each portion of the contact surface has a corresponding contact portion on the opposite side of the centre of the hole.

The bracket is preferably able to move freely relative to the cylindrical sleeve in a direction parallel to the bolt axis.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
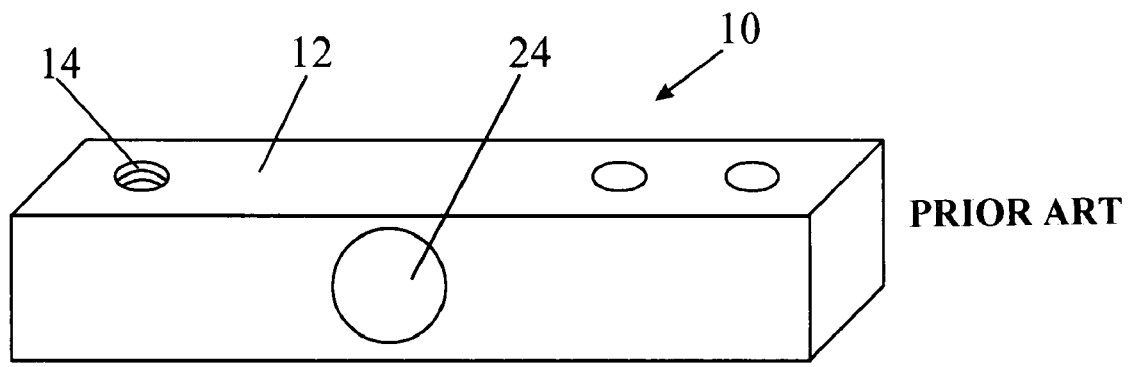
FIG. 1 is a perspective view of a load beam.
Figure 2:
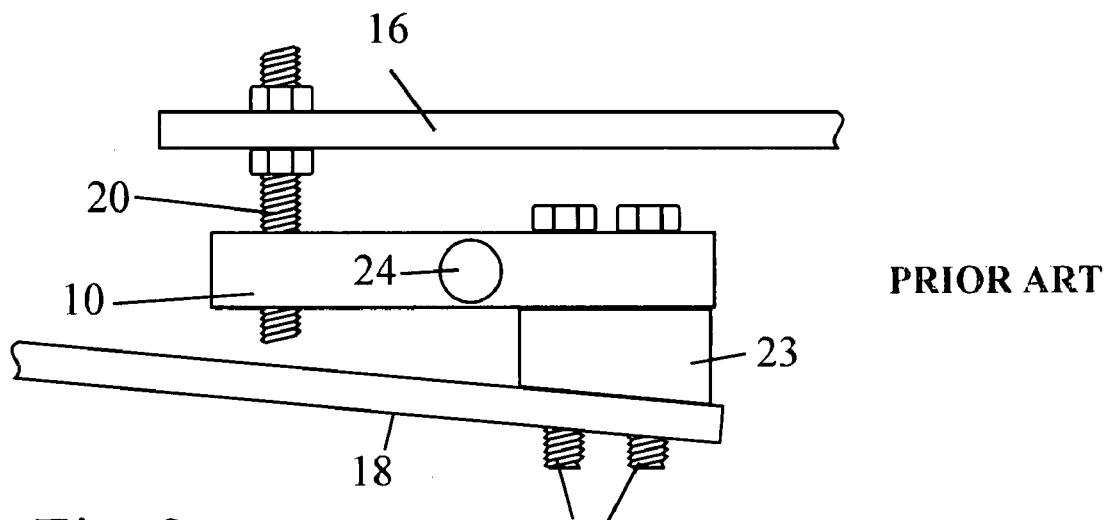
FIG. 2 shows a weighing table mounted in conventional manner by way of a load beam on a support frame.
Figure 3:
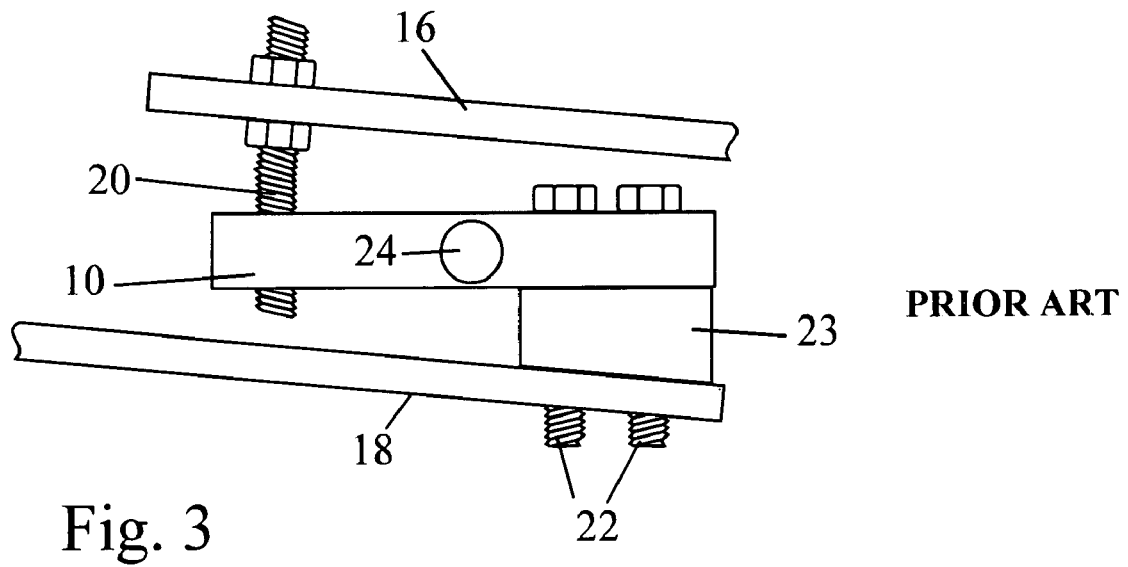
FIG. 3 is a view similar view to that of FIG. 2 showing the bending of the securing bolt if centre of gravity of the weight resting on the weighing table is not aligned with the axis of the securing bolt.
Figure 4:
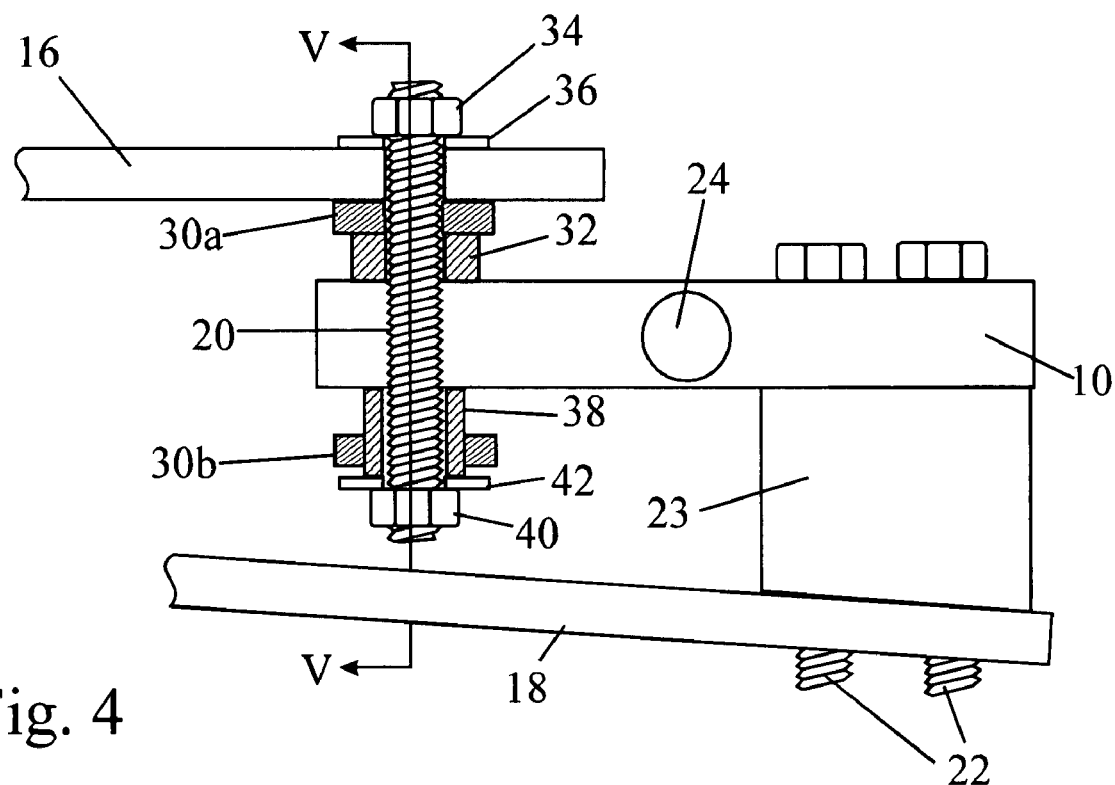
FIG. 4 is a longitudinal section through an embodiment of the present invention showing the manner in which the weighing table is secured to the load beam.
Figure 5:
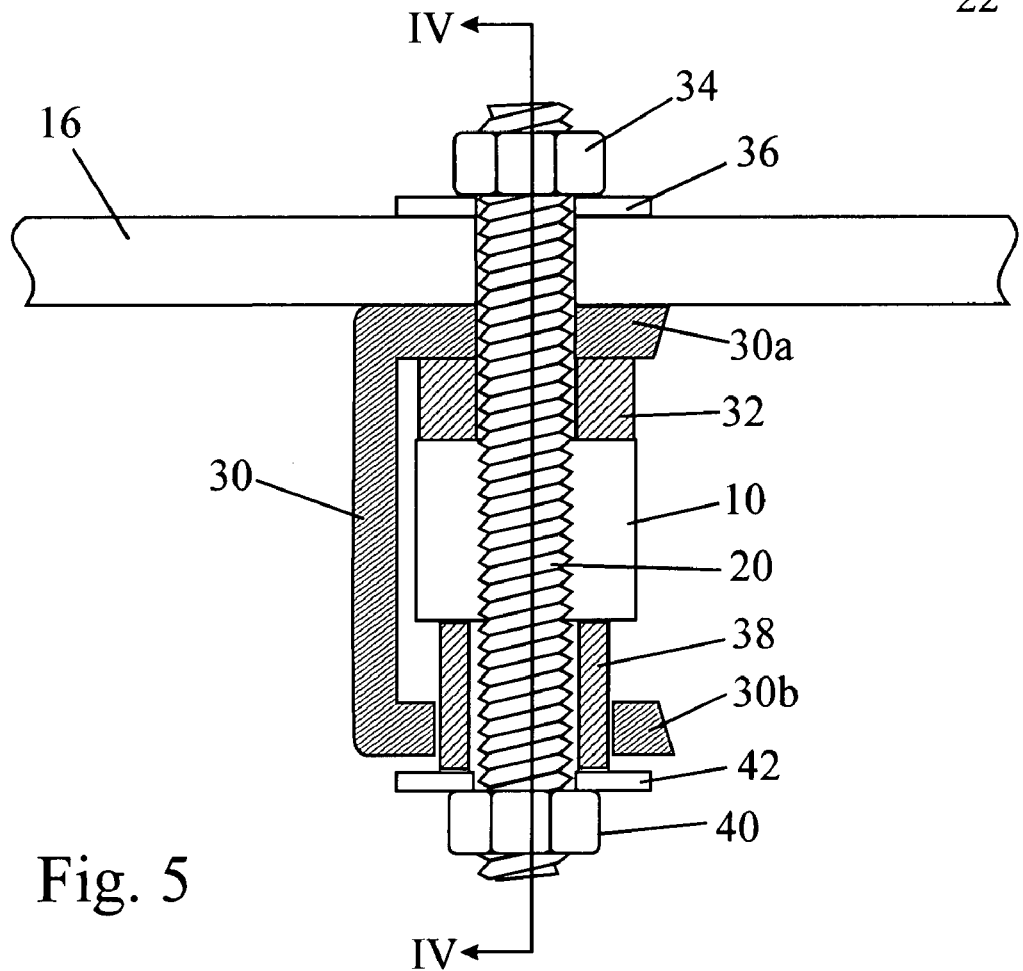
FIG. 5 is a transverse section through the embodiment of the present invention shown in FIG. 4.
Figure 6:
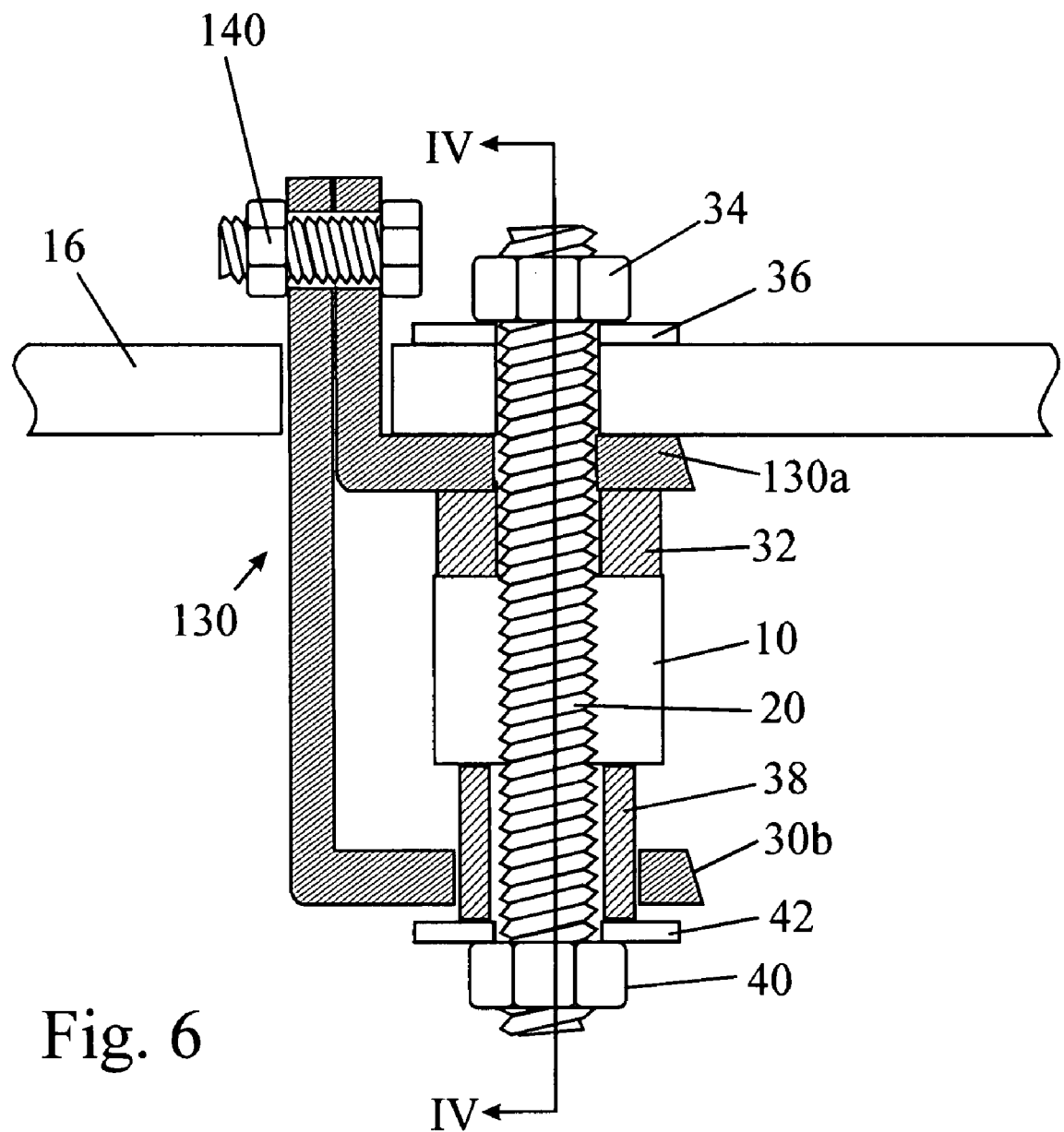
FIG. 6 is a similar view as FIG. 5 of a second embodiment of the invention showing an alternative manner in which the weighing table is secured to the load beam.

A first embodiment of the invention is shown in FIGS. 4 and 5, in which FIG. 5 is a section along the line V-V in FIG. 4 and FIG. 4 is a section along the line IV-IV in FIG. 5. The second embodiment of the invention is shown in FIG. 6 and shows a similar view of the first embodiment showed in FIG. 5. Like components to those already described by reference to FIGS. 1 to 3 have been allocated the same reference numerals and will not be described again.

The securing bolt 20 in FIGS. 4 and 5 passes through a U-shaped bracket 30 having two limbs 30a and 30b disposed above and below the load beam 10, respectively. Square pressure distribution plate 32 is compressed between the upper limb 30a and the upper side of the load beam 10 by tightening a nut 34 which engages the weighing table through a washer 36. As the securing bolt 20 is threaded into the load beam 10, tightening the nut 34 acts to urge the weighing table 16 towards the load beam, at the same time sandwiching the limb 30a of the bracket 30 and the plate 32 between the two.

On the opposite side of the load beam 10, a cylindrical sleeve 38 is clamped against the under side of the load beam 10 by a nut 40 which acts on the sleeve 38 through a washer 42. The lower limb 30b of the bracket 30 has a hole that is close fitted over the outer surface of the sleeve 38 allowing free movement of the bracket 30 relative to the sleeve 38 in a direction parallel to the axis of the securing bolt 20 but preventing any movement of the bracket 30 transverse to axis of the securing bolt 20.

As an alternative, a bracket 130 can be used, which comprises two L-shaped parts 130a and 130b. Like limb 30a, the L-shaped part 130a is placed between the pressure distribution plate 32 and the weighing table 16. The second L-shaped part 130b takes the place of the limb 30b in the first embodiment. The two L-shaped parts 130a and 130b are fixedly connected to each other after installation. This can be done by a bolt 140 or simply by welding the two parts to each other. This embodiment is easier to install and allows a simpler replacement of the load beam 10 in case the load beam 10 is damaged.

In both embodiments, it is important that the contact surface of the pressure distribution plate 32 and the sleeve 38 are such that each portion of the contact surface has a corresponding contact portion on the opposite side of the centre of the hole. The measuring characteristics of the load beam 10 are determined by the distance between the centre of sensor 24 and the centre of the bolt 20. If the pressure distribution plate 32 and the sleeve 38 would not be distributed symmetrical about the bolt 20, the forces which pass through the assembly will be unevenly distributed onto the load beam 10, which results in an error of the measuring signal.

If the plate 32 or sleeve 38 is mounted asymmetrical about the bolt 20, this needs to be compensated by software. Once the assembly is installed, the deviation should be measured and used to compensate the misalignment for the further weight measurements.

The described mountings increases the resistance to bending of the securing bolt 20 because the section of the bolt above the load beam 10 is strengthened by the upper limb 30a or L-shaped part 130a and the pressure distribution plate 32. Furthermore, the bracket 30, 130 is restrained from tilting by its interaction with the sleeve 38 and the lower end of the securing bolt 20.

It is important that all forces travel through the assembly to the load beam, such that a minimum on errors is transmitted to the load beam. The stiffness of the whole is given by the complete assembly while the function of the bolt 20 is simply to keep all parts together. The resistance to bending of the lower end of the securing bolt 20 is further increased by the sleeve 38 which surrounds the bolt 20 and is clamped by the nut 40 to the underside of the load beam 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

What is claimed is:

1. A weighing apparatus comprising a weighing table secured to a support frame by way of a load beam, wherein the load beam is an elongate member having a through hole receiving a securing bolt fixed to the weighing table, characterised in that the securing bolt passes through a stiffening member having parts disposed above and below the load beam, respectively, a pressure distribution plate is compressed by the securing bolt between a first part of the stiffening member and one side of the load beam, and, on the other side of the load beam, a cylindrical sleeve encircling the securing bolt passes through a hole in the second part of the stiffening member to prevent movement of the stiffening member transverse to the axis of the securing bolt.

2. The weighing apparatus of claim 1, wherein the stiffening member is a bracket having two limbs.

3. The weighing apparatus of claim 1, wherein the stiffening member is a bracket having two L-shaped parts, the two L-shaped parts are connected to each other.

4. The weighing apparatus of claim 1, wherein the pressure distribution plate has a contact surface such that each portion of the contact surface has a corresponding contact portion on the opposite side of the axis of the bolt.

5. The weighing apparatus of claim 4, wherein the pressure distribution plate is precisely symmetrical about the axis of the bolt.

6. The weighing apparatus of claim 4, wherein the pressure distribution plate is circular.

7. The weighing apparatus of claim 4, wherein the pressure distribution plate is square.

8. The weighing apparatus of claim 1, wherein the stiffening member is able to move freely relative to the cylindrical sleeve in a direction parallel to the bolt axis.

9. The weighing apparatus of claim 1, wherein the cylindrical sleeve is precisely symmetrical about the axis of the bolt.

* * * * *